US006992252B1

(12) United States Patent
Rao et al.

(10) Patent No.: US 6,992,252 B1
(45) Date of Patent: Jan. 31, 2006

(54) REDUCER BUSHING FOR WEATHERPROOF OUTLET BOXES

(75) Inventors: C. Gireesh Rao, Cary, NC (US); David L. Scheer, Raleigh, NC (US); Ashok Sathyanarayana Alilughatta, Pune (IN)

(73) Assignee: Sigma Electric Manufacturing Corp., Garner, NC (US)

( * ) Notice: Subject to any disclaimer, the term of this patent is extended or adjusted under 35 U.S.C. 154(b) by 19 days.

(21) Appl. No.: 10/907,314

(22) Filed: Mar. 29, 2005

(51) Int. Cl.
 *H02G 3/18* (2006.01)

(52) U.S. Cl. .................. 174/65 R; 174/64; 174/135; 174/50; 220/3.2

(58) Field of Classification Search .............. 174/65 R, 174/64, 65 SS, 14 BH, 11 BH, 135, 50, 58, 174/60; 220/3.2; 403/195; 248/906; 439/535
See application file for complete search history.

(56) References Cited

U.S. PATENT DOCUMENTS 4,151,363 A * 4/1979 Nichols .................... 174/65 R

* cited by examiner

*Primary Examiner*—Dhiru R. Patel
(74) *Attorney, Agent, or Firm*—Mills Law Firm PLLC

(57) ABSTRACT

A removable reducer bushing is carried in a threaded port of an outlet box for coupling with a small threaded conduit and electively removable for coupling with a large threaded conduit thereby permitting a single box to handle multiple conduit sizes without separately procured parts. The bushing includes a deformable thread interruption resisting bushing rotation during removal of the small threaded conduit and frontal slots for manual removal of the bushing with a screwdriver against the resistance of the thread interruption.

10 Claims, 4 Drawing Sheets

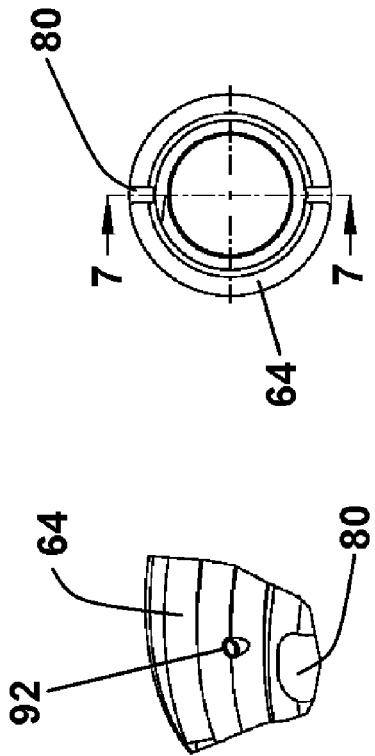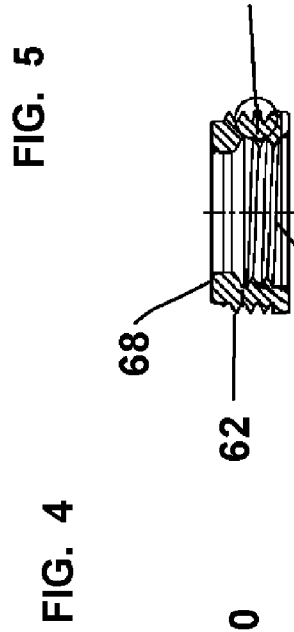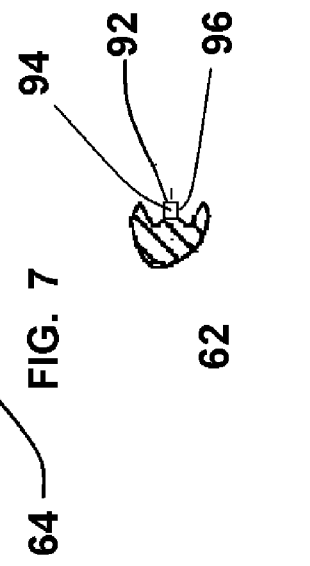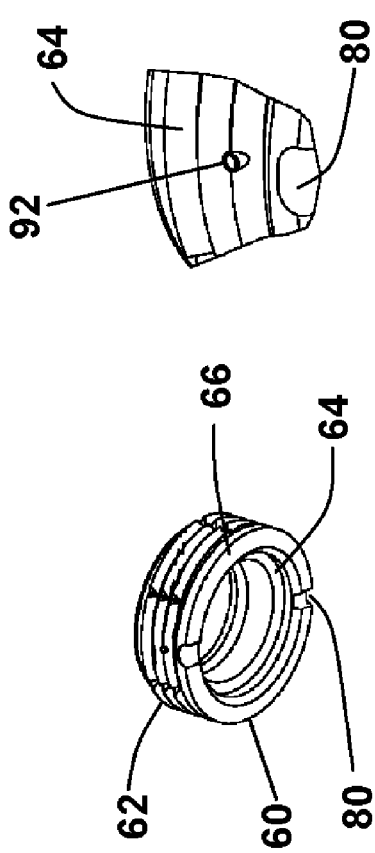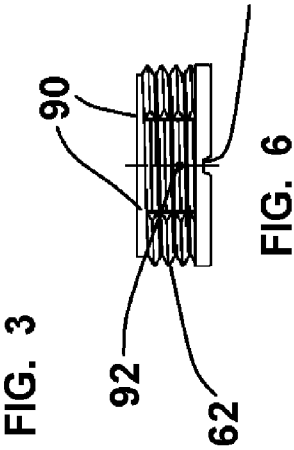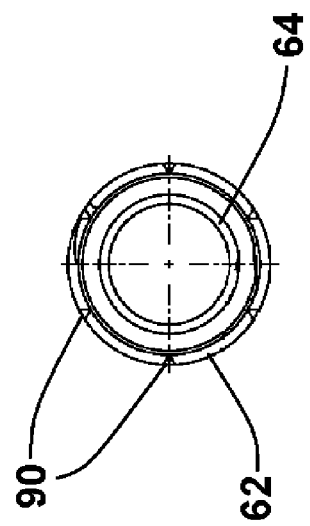

US 6,992,252 B1

REDUCER BUSHING FOR WEATHERPROOF OUTLET BOXES

FIELD OF THE INVENTION

The present invention relates to weatherproof electrical systems and, in particular, to a weatherproof outlet box having a removable reducer bushing for adapting differing electrical conduits without supplemental parts and with simple tools.

BACKGROUND OF THE INVENTION

Outdoor electrical systems need to conform with regulatory provisions to ensure safe and reliable operation in the presence of inclement weather. The outlet boxes and junctions and outlets are particularly prone to moisture conditions, and great care is taken to provide sealed construction. Gasketed cover plates are provided to seal the box cavity. Threaded ports receive rigid threaded conduits to protect against moisture entry at the electrical lines. Currently, commercially available boxes for outdoor use are provided for accepting only a single threaded conduit size. This presents problems for both the supplier and installer. The supplier must carry inventory and devote space for each size. The installer must carry both sizes inasmuch as the complete details of a job might not be fully defined at time of purchase. There are also situations, where due to design conditions or revisions, multiple conduit sizes are presented at a junction or outlet. If a larger conduit is required, the outlet box must be replaced. Where a smaller conduit is required, separately procured reducer bushings are available to handle the size reduction. This provides versatility for the installer, but further complicates supplier inventory.

Available reducer bushings are cylindrical sleeves provided with internal and exterior threads. For assembly, the installer manually threads the bushing into the outlet port, and thereafter threads the conduit into the bushing. To ensure a tight fitting, the installer often uses a wrench for final tightening resulting in a tightly seated condition with the bushing. Should the conduit need to be removed for repair or system modification, difficulties can arise. The breakaway torque at the conduit/bushing interface due to excessive installation force may be greater than the breakaway torque at the bushing/outlet box interface. Accordingly, the bushing rotates with the conduit, and remains attached after conduit removal. Removal of the bushing requires a wrench, which can damage the threads and prevent reuse of the bushing, and in practice both the conduit and bushing are discarded requiring new materials for completing the modification.

SUMMARY OF INVENTION

The present invention provides a weatherproof outlet box that overcomes the above mentioned problems for both the supplier and installer. The outlet box is provided with removable reducer bushings, requiring the stocking of only the large size box to the benefit of the supplier. In addition to the conventional inner and outer threads, the reducer bushings are provided with front slots to facilitate removal and reinstallation with a simple screwdriver. The outer threads include an enlarged thread discontinuity in the form of a radial cylindrical sleeve integral with the threads that swages and deforms during bushing insertion, to provide an increased breakaway torque at the outlet box that enables removal of the conduit without bushing rotation. This breakaway torque, however, may be overcome by a screwdriver at the slots to allow removal and reuse of the bushing. Thus a single outlet box can handle in varying commercial box configurations multiple conduit sizes without separately purchased parts.

Accordingly, it is an object of the invention to provide a weatherproof outlet box that can accommodate differing conduit sizes without supplemental parts.

Another object is to provide a reducer bushing for outlet boxes that resists concurrent rotation when removing an installed conduit.

A further object of the invention is to provide an outlet box containing all necessary components to allow a supplier to stock a single design for multiple applications and allow a user to procure a single design for variable field conditions.

DESCRIPTION OF DRAWINGS

The above and other objects and advantages of the present invention will become apparent upon reading the following detailed description taken in conjunction with the accompanying drawings in which:

FIG. 3 is a perspective view of the reducer bushing of FIG. 1;

FIG. 4 is an enlarged fragmentary perspective view of the circled area of FIG. 3 showing the interruption on the outer thread of the reducer bushing;

FIG. 5 is a front view of the reducer bushing;

FIG. 6 is a side view of the reducer bushing;

FIG. 7 is a cross sectional view taken along line 7—7 in FIG. 5;

FIG. 8 is a rear view of the reducer bushing;

FIG. 9 is an enlarged fragmentary cross sectional of the thread interruption;

DETAILED DESCRIPTION OF THE PREFERRED EMBODIMENTS

Figure 1:
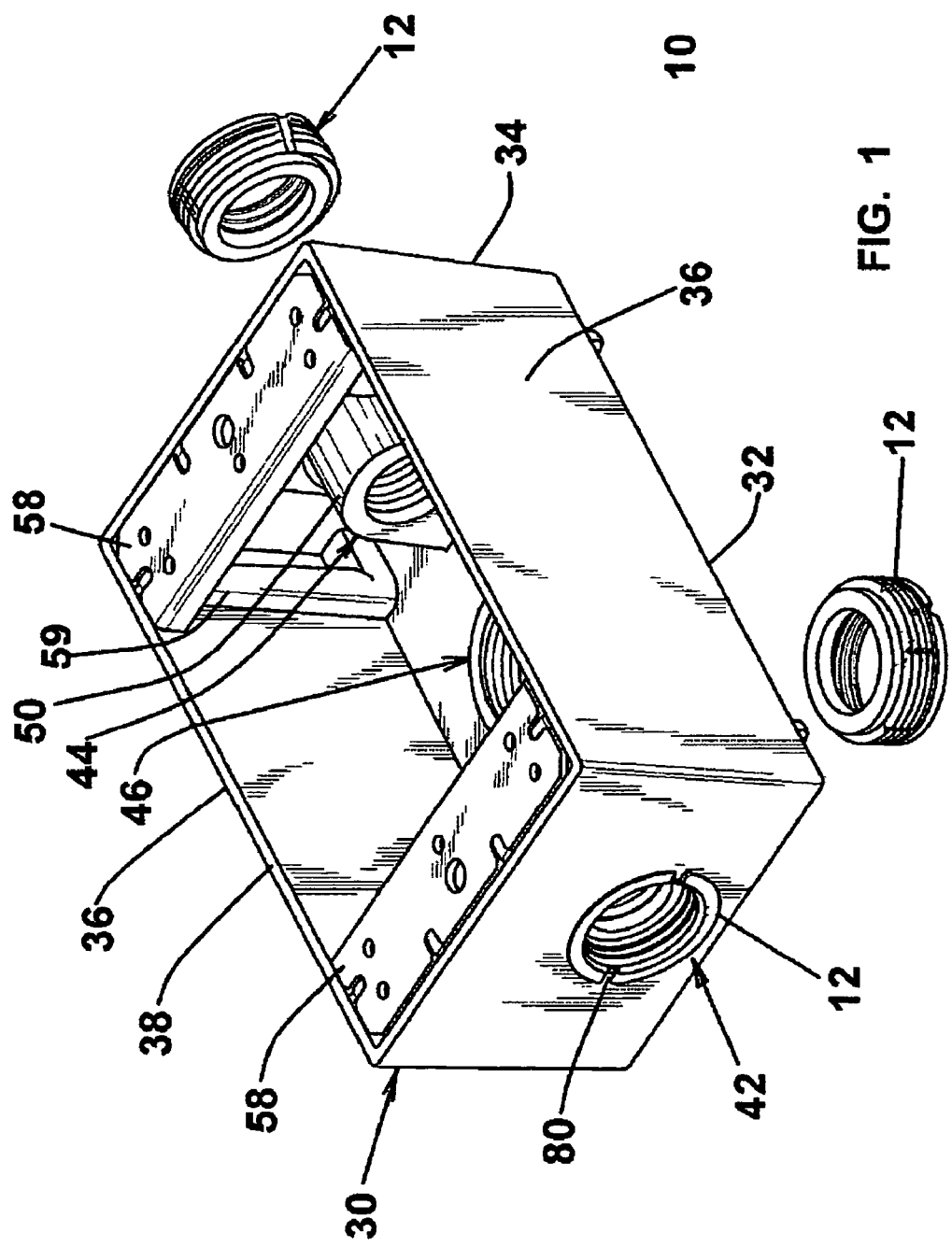
FIG. 1 is a top perspective view of an outlet box provided with reducer bushings in accordance with an embodiment of the invention.

Referring to the FIG. 1, a weatherproof electrical outlet box 10 is provided with removable reducer bushings 12 for allowing an installer, without accessing separate components, to establish on-site connection with conventional threaded rigid conduit and/or connectors of varying sizes using conventionally available tools.

The outlet box may be a single gang, double gang, round, extension or any box or enclosure approved by electrical codes for outdoor use box configuration of the types conventionally used in weather proof installations. As shown, a single gang unit with three port openings is provided, one on either side or one on the bottom. A suitable outlet box for use with the reducer bushings is product no. 11053 available from Sigma Electric Manufacturing Corp., assignee of the present invention.

Figure 10:
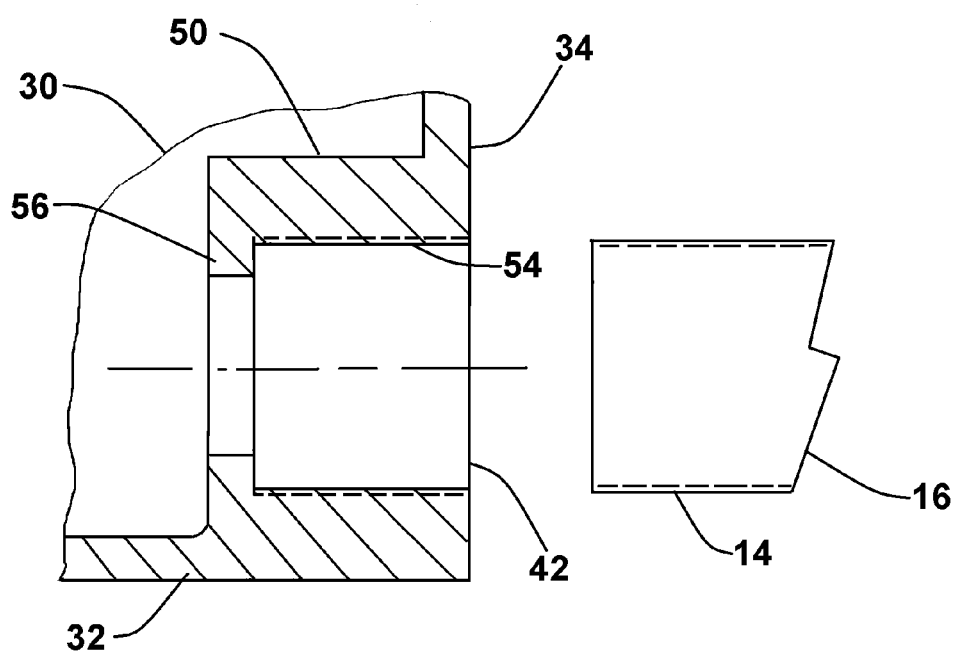
FIG. 10 is a fragmentary cross sectional view showing the outlet box without the reducer bushing for direct connection with a rigid conduit.
Figure 11:
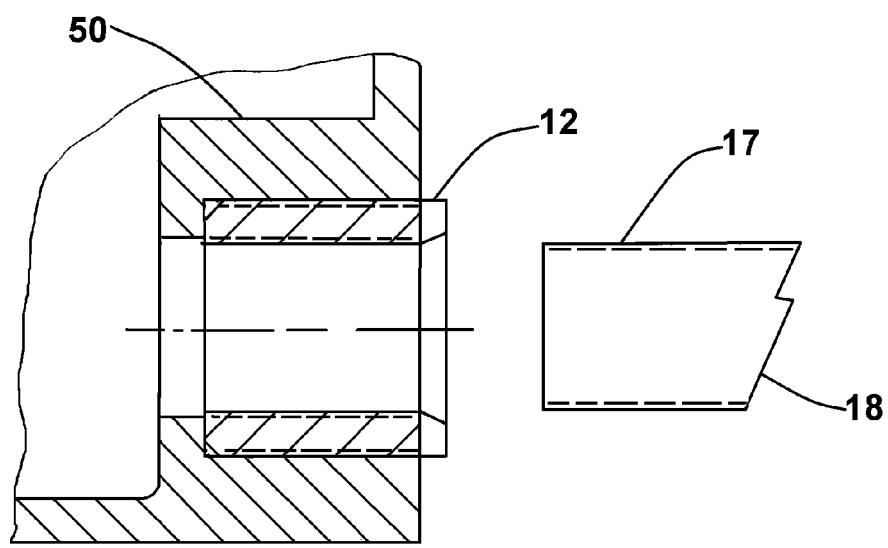
FIG. 11 is a fragmentary cross sectional view showing the outlet box with the reducer bushing for connection with a smaller rigid conduit.

As shown in FIG. 10, the outlet box 10 with the reducer bushing 12 removed is adapted to directly receive the pipe threaded end 14 of a rigid conduit 16 of a first size. As shown in FIG. 11, with the bushing 12 inserted the pipe threaded end 17 of a rigid conduit 18 of a smaller second size is coupled. In the present embodiment, the referenced outlet box is adapted to handle ½ in. and ¾ in. threaded conduit and with be described with reference thereto. The threaded connections are provided with 14 NPSM (American Standard Straight Mechanical Pipe Thread) pipe threads. In both conditions, the conduit connection at the box meets prevailing UL Standard 514 regarding conduit and fittings.

The outlet box 10 includes a unitary outlet body 30 formed of die cast aluminum. The body includes a rectangular base wall 32 circumscribed by forwardly projecting longitudinally spaced parallel end walls 34 and transversely spaced parallel side walls 36 terminating at an upper rim 38. The interior surfaces of the walls provide a forwardly opening wiring cavity 40. The outlet box 10 includes three access ports; ports 42, 44 at the end walls 34, and port 46 at the base wall 32. As representatively shown for the side port 42 in FIGS. 10 and 11, an annular body or lug 50 is integrally formed with the associated wall 34. The lug 50 includes a central bore 52 having an outwardly opening portion provided with internal pipe threads 54 and inwardly terminating at an inwardly extending annular flange 56. The threads 54 are adapted to receive, with the bushing 12 removed, the threaded end 17 of the larger conduit 16, and with the bushing 12 installed, the threaded end 17 of the smaller conduit 18. The axial length of the threads is sufficient to receive typical threaded conduits to providing at least about five thread turns for pull strength in accordance with regulatory requirements.

The outlet box 10 is provided with apertured mounting plates 58 carried on upwardly projecting threaded posts 59 at the end walls adjacent the rim for accommodating mounting of electrical devices, such as switches and receptacles and/or cover plates. In final assembly, the box, cover plate and conduit connections provide a weatherproof assembly.

Referring to FIGS. 1 and 3 through 9, the reducer bushing 12 comprises a one-piece annular body 60 formed of a suitable material such as a zinc die casting. The bushing 12 has an exterior pipe threaded section 62 and an interior pipe threaded section 64. The body 60 frontally terminates with an annular rim 66 and rearwardly terminates with an annular base 68. The outer threaded section 62 an outer diameter substantially the same as the rim 60. The interior threaded section 64 extends rearwardly from a frustoconical entry surface 74 to the base 68.

The rim 66 includes a pair of diametrically opposed frontally opening U-shaped slots 80, providing wide diameter reacting surfaces for facilitating the insertion and removal of the bushing 12 with a simple tool, such as a screwdriver or other bladed device. A plurality of circumferentially spaced, axially aligned V-shapes grooves 90 are formed in and across the external threads to form a helical series of serrated thread sections 92. The grooves 90 extend rearwardly from the base of the rim. The grooves 90 are effective for limiting the removal torque necessary for remove the bushing without damage to the outlet box and for reducing the overall weight of the bushing and the manufacturing costs thereof. For the described outlet box accepting ½ and ¾ in. conduit, a circumferential series of six aligned grooves 90 are provided.

An enlarged thread interruption or ferrule 92 is formed at a center portion of the outer threaded section 62. In assembly, the interruption 92 is deformed and swaged against the threads 54 of the outlet box lug 50 to increase the bushing breakaway torque sufficient to insure that the conduit 18 will be removable without rotating the bushing 12. The removal torque, however, does not limit the manual removal of the bushing using a screwdriver at the larger diameter slots 80. Referring to FIGS. 4 and 9, the interruption comprises a local cylindrical sleeve at an intermediate turn of the thread 62. The interruption 92 terminates radially at the diameter of the threads and the outer wall projects axially from the sides of the thread. The interruption 92 includes an outwardly opening counterbore 94 whereby the interruption 92 has a thin cylindrical wall 96. Upon insertion, the wall 96 is deformed and establishes an increased mechanical engagement with the lug to increase the breakaway torque. For ¾ inch to ½ inch reducer bushing, an interruption having an axial length of about 0.030 inch, an outer diameter of 0.034 inch and an inner diameter of about 0.018 inch provides sufficient torque resistance to prevent busing rotation upon removal of a firmly seated inner conduit. The hollow cylindrical configuration promotes the swaging during installation, however, solid construction and/or alternative cross sectional shapes may obviously be utilized.

Figure 2:
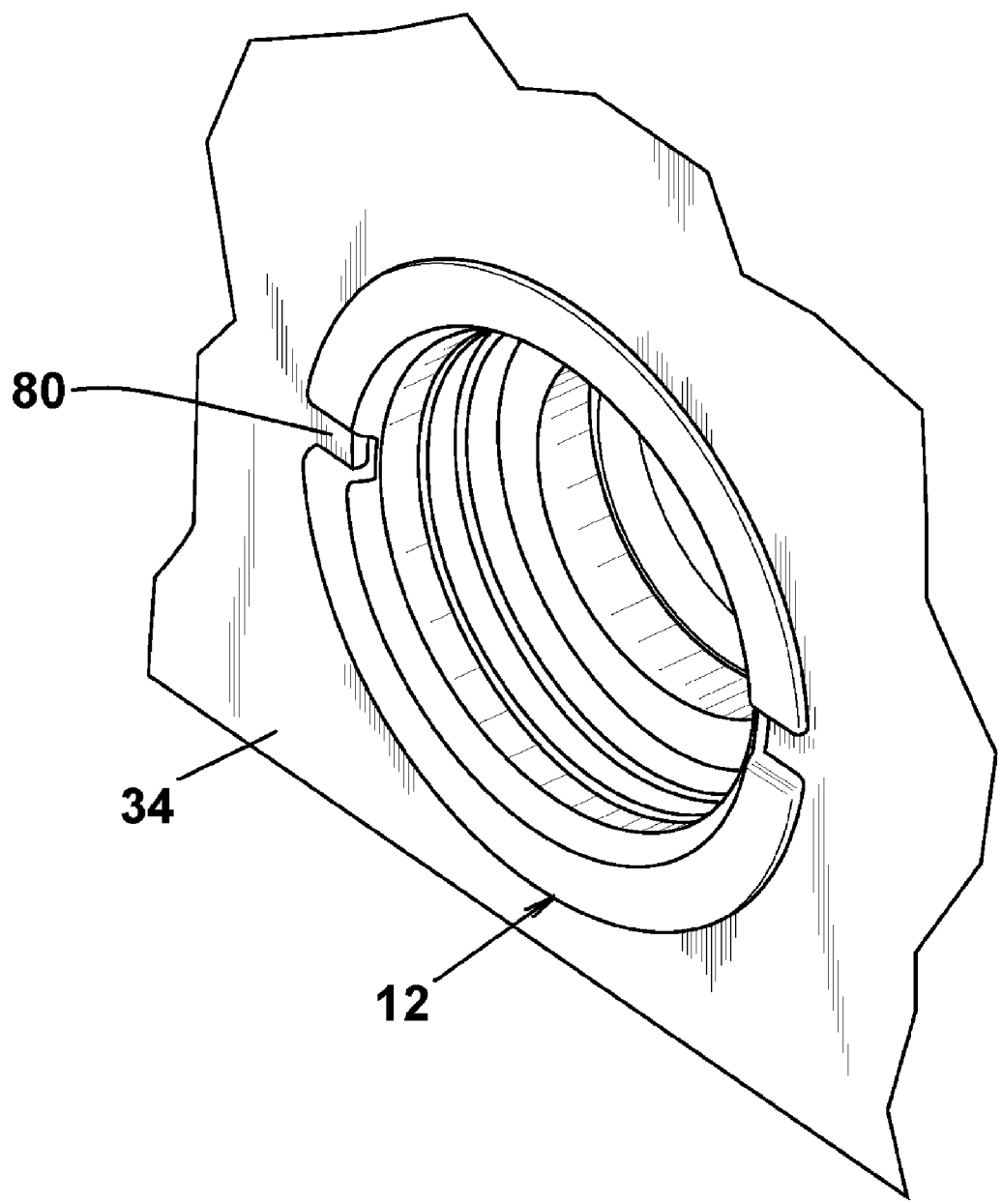
FIG. 2 is an enlarged fragmentary front perspective view of the outlet box and reducer bushing of FIG. 1.

In assembly as shown in FIGS. 2 and 11, the bushing 12 is threaded into an outlet box opening until the base seats against the flange 56, manually and/or using a tool torquing at the slots thereby swaging the interruption 92 against the threads 54. At seating, the rim of the bushing 12 is slightly exposed beyond the outlet box outer wall 34 thereby allowing the user of tools of varying widths. The outlet box 10 thus enables the installer to adapt for conduit sizes without the need for separately obtained adapters, and to source a single box design for multiple conduits applications.

While the invention has been described with reference to outlet boxes furnished with the bushings installed, it is apparent that the bushings may be used as a separate component for existing boxes and compatible box designs for providing the versatility and advantages in accommodating differing sized conduits.

The above description is intended to be illustrative of the preferred embodiment, and modifications and improvements thereto will become apparent to those in the art. Accordingly, the scope of the invention should be construed solely in accordance with the appended claims.

What is claimed is:

1. In an electrical system having an outlet box member with at least one threaded port for coupling with a threaded end of a first conduit of a first size, a reducer bushing for facilitating coupling with a threaded end of a second conduit of a smaller second size, said reducer bushing comprising: an annular body having an annular front surface and an annular rear surface, an exterior threaded surface for coupling with the threaded port of the box member and an interior threaded surface for coupling with the threaded end of the second conduit, said exterior threaded surface having an enlarged deformable portion swaged in the coupling with the port providing increased mechanical resistance to uncoupling of said annular body; and a pair of diametrically opposed slots formed in said front surface for receiving a bladed tool for developing a torque overcoming said mechanical resistance and effecting uncoupling of said annular body from the threaded port.

2. The electrical system as recited in claim 1 wherein said exterior threaded surface comprises a helical pipe thread of multiple turns having diverging side surfaces and said enlarged deformable portion extends outwardly from said side surfaces.

3. The electrical system as recited in claim 2 wherein said deformable portion has generally cylindrical outer surfaces.

4. The electrical system as recited in claim 3 wherein said deformable portion includes an outwardly opening aperture defining with said cylindrical outer surfaces a thin wall that is swaged in coupling with the threaded port.

5. The electrical system as recited in claim 4 wherein said helical pipe threads includes about five turns.

6. The electrical system as recited in claim 5 wherein said deformable portion is formed at an intermediate turns of said helical pipe threads.

7. An outlet box for coupling with threaded ends of first and second conduits of differing size, said outlet box member comprising: a housing body having a plurality of ports communicating with an outwardly opening cavity, said ports including an inwardly threaded section for threaded coupling the threaded end of one of the conduits; bushing members each including an annular body having an outer threaded section coupled with a threaded port, said outer threaded section an enlarged deformable section deformed during said coupling and effective for increasing mechanical engagement with said threaded section of said port, said annular body having an inner threaded section coupled with said threaded section of the other of said conduits, said annular body having an outer section extending outwardly of said housing body and including a pair of diametrically opposed slots for operative engagement with the blade of a removal tool, the arrangement being such that said mechanical engagement is sufficient to resist rotation of said bushing member during decoupling of said other of said conduits and the removal tool can develop sufficient decoupling force to overcome said mechanical resistance and effect removal of said bushing member from said port.

8. The outlet box as recited in claim 7 wherein said enlarged section a radially extending cylindrical member having deformable outer walls.

9. The outlet box as recited in claim 8 wherein cylindrical member includes an outwardly opening circular aperture thereby providing said deformable outer walls.

10. The outlet box as recited in claim 8 wherein said cylindrical member radially outwardly terminates at the diameter of said outer threaded section.

\* \* \* \* \*